Nov. 5, 1968  H. OKITA ET AL  3,408,823
SEED TAPE PLANTING MACHINE
Filed Nov. 9, 1966  2 Sheets-Sheet 1
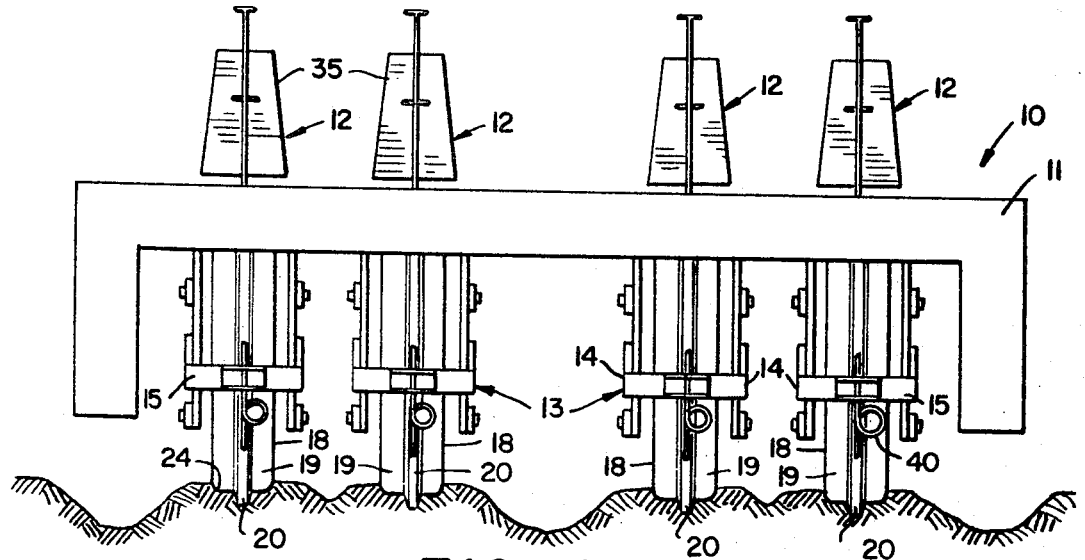
FIG_1
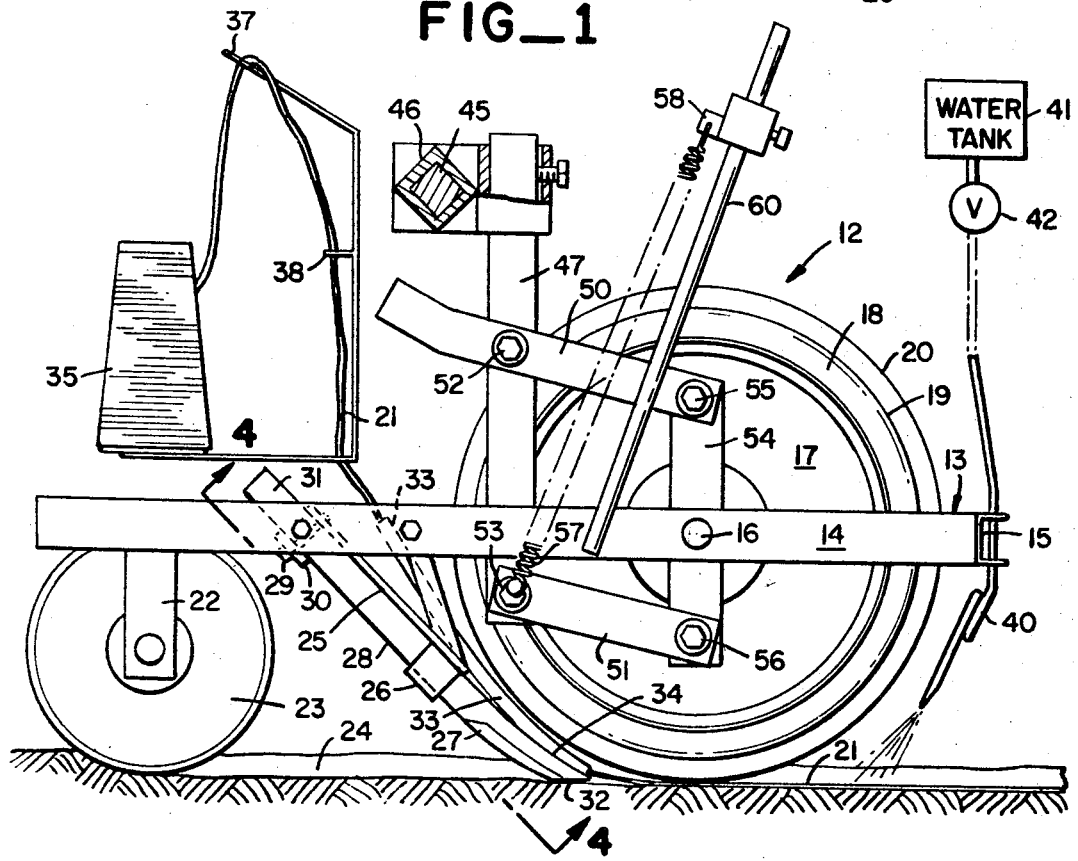
FIG_2
INVENTORS
HARUTO OKITA
FREDERICK W. ROHNERT
JAMES W. CHANEY
Owen, Wickersham & Erickson
ATTORNEYS

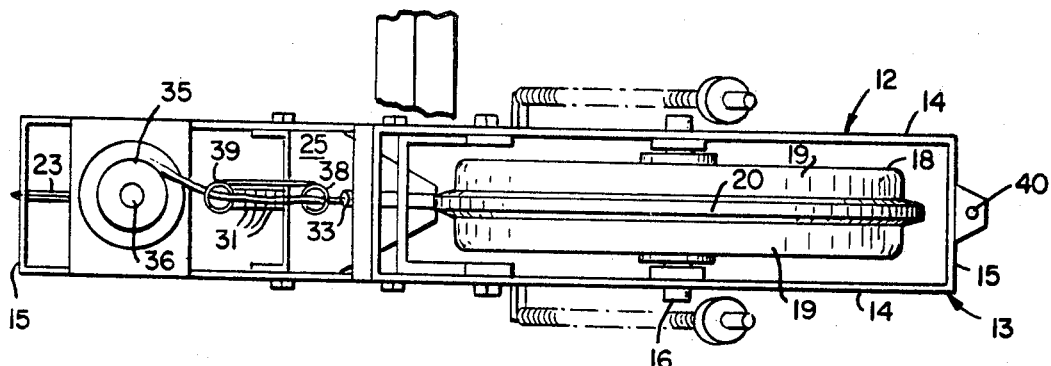
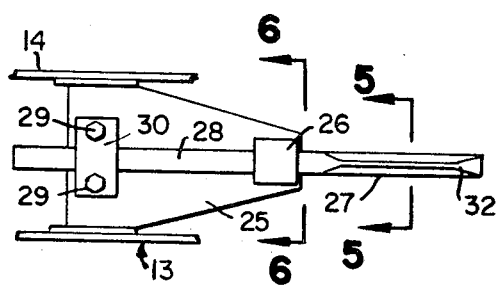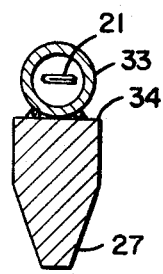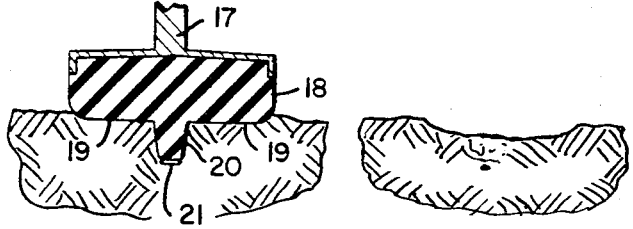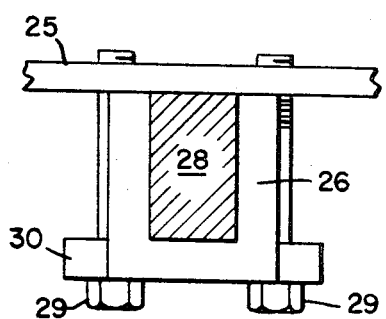

United States Patent Office 3,408,823
Patented Nov. 5, 1968

3,408,823
SEED TAPE PLANTING MACHINE
Haruto Okita and Frederick W. Rohnert, Hollister, and James W. Chaney, Gilroy, Calif., assignors to Waldo Rohnert Co., Hollister, Calif., a corporation of California
Filed Nov. 9, 1966, Ser. No. 593,192
7 Claims. (Cl. 61—72.6)

This invention relates to a seed planting machine and, more particularly, to a device for planting seed tape.

While it has long been proposed to plant tapes carrying seed, seed tapes have only recently come into the realm of practicality. A seed tape which we invented (patent application Ser. No. 519,674, filed Jan. 10, 1966, now U.S. Patent No. 3,328,916) is practical; it is characterized by the utilization of a water-soluble polyethylene oxide which dissolves readily when water is applied thereto. It is important to have seed tape of high tensile strength but that is readily water-soluble so that, when subjected to sufficient moisture, it practically vanishes, leaving only the seed in the set location without any hampering portion of the tape itself.

The present invention enables the farmer to plant the seed tape mechanically and to do so rapidly, thereby quickly depositing his seeds at precise depth, properly oriented and at correctly spaced intervals. It involves the steps of unwinding the seed tape from a spool or core, putting it in a furrow in the ground, and pressing it firmly in place.

One object of the invention is to provide a simply operated, improved seed-tape planter.

Another object of the invention is to enable rapid planting of seed tape.

Another object of the invention is to provide a seed tape planter in which obstacles in the path of a seed row are immediately taken care of just before planting in which the seed tape is firmly pressed into the ground as it is planted.

Other objects and advantages of the invention will appear from the following description of the preferred form.

In the drawings:

FIG. 1 is a view in rear elevation of a portion of a planting machine preferably tractor drawn, comprising four subassemblies, each of which plants tape.

FIG. 2 is a view in side elevation of one of the seed tape planting subassemblies of FIG. 1. A portion of the view is broken away and shown in section.

FIG. 3 is a top plan view of the seed tape planting subassembly of FIG. 2.

FIG. 4 is a fragmentary view partly in section taken along the line 4—4 in FIG. 2.

FIG. 5 is an enlarged view in section taken along the line 5—5 in FIG. 4.

FIG. 6 is an enlarged view in section taken along the line 6—6 in FIG. 4.

FIG. 7 is a fragmentary view in rear elevation and section showing the seed tape being planted.

FIG. 8 is a view similar to FIG. 7 showing the seed in the ground with tape dissolved after being planted and watered.

A typical seed planting apparatus according to this invention involves an assembly 10 having a frame 11 which supports a plurality of seed planting subassemblies 12, as shown in FIG. 1. Here four subassemblies 12 are shown, for planting four rows simultaneously; there may be more or fewer, as desired. The subassemblies 12 are identical to each other and are best seen in FIGS. 2 and 3. Each subassembly 12 comprises a fore and aft lengthwise extending frame 13 comprising basically a pair of longitudinally extending members 14 and several horizontal crossmembers 15. The frame 13 supports a shaft or axle 16 on which is mounted a wheel 17, preferably carrying a tire 18 with a broad, flat tread surface 19 and a circumferential radially outwardly extending projection 20 which is used to press the seed tape 21 into the ground and is only slightly wider than the seed tape 21.

A depending yoke 22 secured to the frame 13 supports a coulter disc 23 near the front end of the frame 13. Thus, the coulter 23 and the tired wheel 17 are longitudinally in line with the fore and aft axis of the frame 13 and operate along the same line of action. The coulter 23 cuts a furrow 24 into the soil and cuts through any plant material or other matter that may need severing before the tape 21 is put in the furrow 24.

The frame 13 also supports a stationary plate number 25 which is shown in FIG. 4 as being generally trapezoidal in shape and having a guide bracket 26 welded to its lower end. A plow-share member 27 has a stem 28 that extends through the guide bracket 26 and is held to the plate 25 by bolts 29 and a clamp 30. The stem 28 of the plowshare 27 carried on its upper surface at its upper end a series of calibrations 31 (see FIG. 3) showing the depth to which the lower end 32 of the plowshare 27 extends into the soil. Thus, that depth is adjustable relative to the wheel 17 and the disc 23.

A tube 33 is secured to the upper surface 34 of the plowshare 27 and extends down closely adjacent the bottom portion 32 thereof. The tube 33 extends up to about the top of the plowshare and is open at both ends. It is used to guide the seed tape 21 into the furrow 24 created first by the coulter 23 and widened and shaped by the plowshare 27.

The seed tape 21 typically comes wound around a frustoconical core 35 which is mounted on a suitable vertical shaft 36 so that the tape 21 is free to unwind. The tape 21 then is passed up over an upper guide member 37 and through a somewhat lower guide ring 38 into the tube 33, whence it is pulled out beyond the plowshare 27 before starting.

The frame 13 also supports at its rear end a tube 40, which is connected to a water tank 41 having a valve 42 thereof. The idea is that since water dissolves the tape 20, the water is turned on momentarily whenever the operator comes to the end of a row in order to cut the tape 21 at that point, and then when he moves around to the next series of rows, the planting operation can start again.

The frame 13 is mounted for connection to a rigid member 45 of the frame 11, a clamp tube 46 rides on the member 45 and is secured to a vertical bar 47, to which are secured two parallel bars 50 and 51 by pivot bolts 52 and 53. A bar 54 is journaled around the axle 16 and attached thereby, in effect, to the frame 13 and is pivotbolted to the bars 50 and 51 by bolts 55 and 56. A pair of coil springs 57 are anchored to the bar 51 near the bolt 53 and to an adjustable anchor 59, which is adjustably secured to a rod 60, which is secured to the frame 13. This structure provides a resilient, spring support for the frame 13 and wheel 17.

In operation, the subassemblies 12 are mounted on their main assembly 10, each subassembly 12 having its seed tape 21 in place threaded through the tube 33 and extending out a little beyond the rear of the plowshare 27. As the device goes through the field, the coulter 23 cuts weeds, grass or other particles in line and enables the plowshare 27 to make a consistent furrow in which the seed tape 21 is laid immediately behind it. The projection 20 and the tread 19 of the tire 18 flatten the furrow 24 and firmly press the seed tape 21 into the ground at a controlled constant depth. Whenever sufficient moisture for normally germinating seed is present in the soil, the seed tape 21 will dissolve leaving the seed in the ground as in FIG. 8. Whenever the operator comes to the end of a row, he operates the valve 42 to send a jet of water to cut off the tape 21 at that point.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:
1. A seed tape planting device, including in combination:
   a supporting frame extending lengthwise and having a forward end and a rear end,
   a coulter wheel supported by said frame in fore-and-aft alignment therewith adjacent said forward end,
   a tired wheel adjacent the rear end of said frame and in fore-and-aft alignment therewith, said tired wheel having a central radially outward circumferential projection therearound,
   tape-core support means adjacent said forward end of said frame for supporting a core around which the seed tape is wound,
   a plowshare just forward of said tired wheel supported by said frame, and
   seed-tape feeding means supported by said plowshare terminating adjacent the lower end of said plowshare.

2. The device of claim 1 having a water dispensing tube supported by said frame to the rear of said tired wheel for cuting said tape at the end of a row.

3. The device of claim 1 wherein said seed-tape feeding means comprises a tube.

4. The device of claim 1 having means for moving said plowshare diagonally to vary its depth into the soil relatively to said wheels.

5. The device of claim 1 having means for attaching said frame to a tractor device and resilient spring means interposed between said means for attaching and said tired wheel, and plowshare for enabling said tired wheel and said plowshare to ride parallel to the soil surface independently of said tractor device, enabling accurate and constant depth placement of the seed tape in the soil.

6. A seed tape planting device including in combination:
   a tractor device, a supporting frame resiliently mounted with respect to and on said tractor device, extending lengthwise and having a forward end and a rear end,
   a coulter disc supported by said frame in fore-and-aft alignment therewith adjacent said forward end,
   a tired wheel adjacent the rear end of said frame and in fore-and-aft alignment with said disc, said tired wheel having a central radially outward circumferential projection therearound,
   tape-core support means adjacent said forward end of said frame above said coulter disc for supporting a core of wound seed tape,
   a plowshare just forward of said tired wheel supported by said frame,
   a seed tape feeding tube supported by said plowshare terminating adjacent the lower end of said plowshare, and
   a water dispensing tube supported by said frame to the rear of said tired wheel for cutting said tape at the end of a row.

7. The device of claim 6 having means for moving said plowshare diagonally to vary its depth into the soil relatively to said wheels.

References Cited
UNITED STATES PATENTS

| | | | |
|---|---|---|---|
| 2,155,044 | 4/1939 | Gray et al. | 61—72.6 |
| 3,059,437 | 10/1962 | Jennings et al. | 61—72.6 |
| 3,065,605 | 11/1962 | Zitko | 61—72.6 |

FOREIGN PATENTS

| | | |
|---|---|---|
| 817,157 | 7/1959 | Great Britain. |

ROBERT E. BAGWILL, *Primary Examiner.*